A. W. SHAW.
PLOW.
APPLICATION FILED AUG. 30, 1916.

1,257,127. Patented Feb. 19, 1918.

UNITED STATES PATENT OFFICE.

ARCHIBALD W. SHAW, OF DREW, MISSISSIPPI.

PLOW.

1,257,127.  Specification of Letters Patent.  Patented Feb. 19, 1918.

Application filed August 30, 1916. Serial No. 117,572.

*To all whom it may concern:*

Be it known that I, ARCHIBALD W. SHAW, a citizen of the United States, residing at Drew, in the county of Sunflower and State of Mississippi, have invented certain new and useful Improvements in Plows, of which the following is a full, clear, and exact description, such as will enable anyone skilled in the art to make and use same.

The objects of my invention are to make a plow which will open up a furrow and while same is open will loosen the ground beneath, thus doing away with the hard, smooth furrow bottom, left in many cases, by subsoiling same.

I accomplish these objects as will be more fully hereinafter set forth in the drawings, specifications and claim:

Figure 1:
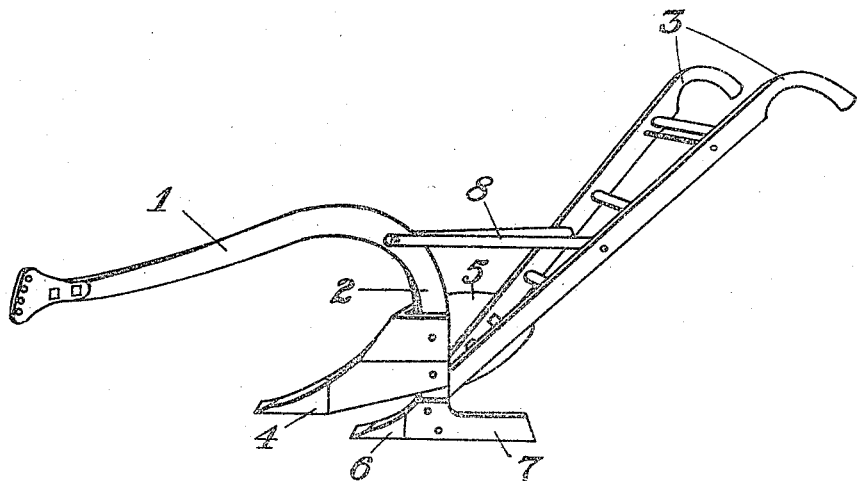
Figure 1 is a side elevation of an ordinary turning plow embodying my improvements.
Figure 2:
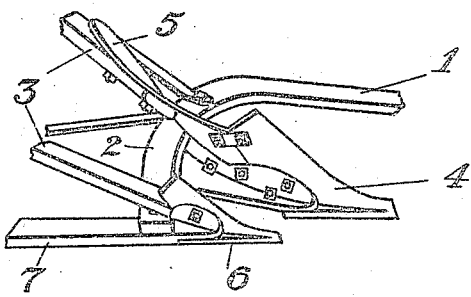
Fig. 2 is a perspective view of the bottom of the same plow.

Referring now to the drawings, in which the various parts are indicated by numerals,—1 is the plow beam, here shown of metal and curving into and forming the plow standard. 2 and 3 are the plow handles. 4 and 5 respectively designate the primary or principal plow share and mold board. The plow standard 2 extends below the level of the primary plow share 4, hereinafter called the plow share, and carries a secondary plow share, or subsoil point (hereinafter called the subsoil point 6) which extends backward to form the landside 7. This subsoil point is preferably much smaller than the plow share 4 and does not carry a mold or turning board. It will be especially noted that not only is this subsoil point 6 and the landside 7 attached to the standard below the level of the point 4, but also that it is attached behind the point 4.

In use the plow share 4 breaks the ground and the mold board 5 raises and throws the loosened dirt to one side in the case of the turning plow and to both sides in the case of the double mold board plow. This action of the plow gives a certain amount of free space immediately under the plow from which the dirt has been cut away and raised; in this space the subsoil point 7, following the plow share 4, breaks up and thoroughly loosens the subsoil and allows it to fall back in practically its original place, there to be covered later by the soil from the main plow, but with the almost hardpan bottom left by the plowing action of the main plow, on some soils, effectually broken up. Subsoiling is deemed necessary in many soils, and by my improvement I accomplish the desired result with the minimum of power, since the ground is subsoiled while free from the top dirt.

It is, of course, evident that a wooden beam plow may be used in place of the metal beam and that the method of attaching the standard to the beam is not essential. It is also evident that my improvement may be used on the majority of the various types of plows now in use.

Having fully described my invention, what I claim and desire to secure by Letters Patent in the United States is:—

In a plow, the combination with a main beam curving downwardly at one end to form a substantially vertical standard and a main plow share and mold board attached thereto above the lower extremity of said standard; of subsoiling means comprising a plow connected to the lower end of the standard below the main plow share and mold board and including a point disposed substantially midway of the main plow point and rear extremity of the mold board whereby to act upon the subsoil where the upper stratum is removed therefrom, and a landside extending rearwardly of said subsoiling point and terminating substantially in alinement with the rear end of the main mold board; and plow handles connected to the standard at the point of connection of the subsoiling means therewith.

In testimony whereof I have hereunto set my name.

ARCHIBALD W. SHAW.

Witnesses:
R. E. TOWNSEND,
S. A. RIDDELL.